Figure 1:
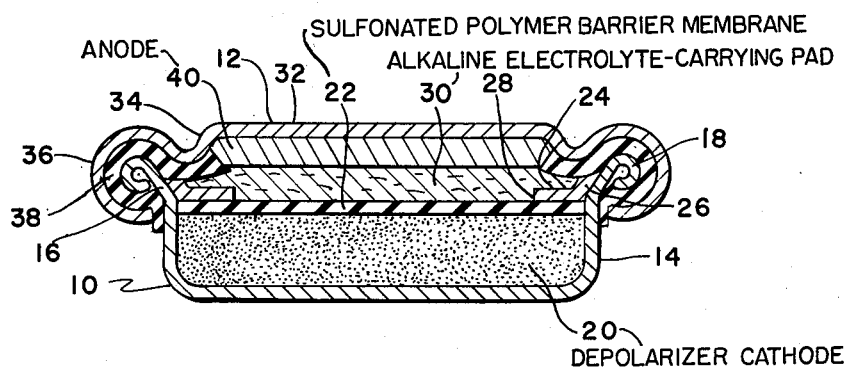

Jan. 2, 1962     E. S. LONG     3,015,681

PRIMARY CELL

Filed Nov. 6, 1958

INVENTOR
Edgar S. Long

BY Diggins & LeBlanc
ATTORNEYS

United States Patent Office 3,015,681
Patented Jan. 2, 1962

3,015,681
PRIMARY CELL
Edgar S. Long, Lancaster, Pa., assignor to Hamilton Watch Company, Lancaster, Pa., a corporation of Pennsylvania
Filed Nov. 6, 1958, Ser. No. 772,261
10 Claims. (Cl. 136—111)

This invention relates to a primary cell and more particularly to an alkaline primary cell of the disc or wafer type.

Conventional alkaline cells, as those having a zinc anode, mercuric oxide depolarizer cathode and potassium or sodium hydroxide electrolyte, have more or less recently achieved a widespread application in a variety of different types of equipment. While considerable effort has been directed towards prolonging the life of such cells, particularly the shelf life where they are intended for military usage, one difficulty frequently encountered, and verified by microscopic examination, is the migration of mercuric oxide particles and tiny drops of free mercury which form a path between the anode and cathode to at least partially short circuit the battery and thereby materially decrease its life.

It is accordingly a primary object of the present invention to provide a primary alkaline cell having a long shelf life and which is provided with a means to prevent the formation of unwanted current carrying paths between the electrodes within the cell whereby the cell is at least partially short circuited and its power depleted.

It is another object of the invention to provide a primary alkaline cell having a novel barrier disc or screen between the cathode and anode for the prevention of undesired migration of particles within the cell.

While primary dry cells of the disc type have heretofore been manufactured with barriers of a large variety of types between the anode and cathode to prevent the undesired migration of particles therebetween, such barriers have not been completely effective in alkaline cells wherein free mercury is formed. I have now found that this undesired migration may be substantially eliminated if the barrier material is formed of a sulfonated polymer of the type customarily employed for its cation exchange characteristics.

From the ion exchange standpoint a cation permeable membrane may be regarded as a three dimensional network of an insoluble organic polymer. Bound into the chains which make up this network are reactive chemical groups such as sulphonic ($SO_3H$), carboxylic ($CO_2H$), or phenolic (OH). The interstices between the chains are filled with water, and the attached acidic groups, being more or less free to dissociate, are capable of exchanging any cations which may be in the water in the interstices. Random passages exist through the membranes which, in the ideal case, are of such width that ions can pass through only by displacing some of the ions of the acidic groups lining the passages.

The ideal permselective membrane would permit free passage of ions of one charge and would prevent completely the passage of ions of opposite charge. While complete permselectivity is not achieved in practice, certain membranes do approach the ideal in dilute solution. As the concentration of the external solution is increased, however, the degree of permselectivity of a given membrane decreases and membranes of which I am aware show but slight effectiveness in preventing passage of hydrogen or hydroxyl ions where the external solution consists of an acid or base.

While it has been proposed to utilize ion exchange membranes in wet cells of the Daniell type and to utilize an ion exchange paste in primary dry cells of the Leclanche type in order to obtain an ion exchange effect, the foregoing phenomena indicates that these membranes or diaphragms are of little if any ion exchange value in alkaline cells. Tests confirm this conclusion to the extent that ion exchange membranes or barriers do not act as permselective barriers to any practical extent in alkaline cells and this fact has led the art to conclude that the use of such relatively expensive membranes could not be justified where they practically completely fail to perform their intended function.

After continuing tests, however, I have now found that while membranes of this nature do not act in a permselective manner they are unexpectedly quite valuable in cells of this type in that their peculiar physical structure largely prevents the unwanted migration of particles, such as free mercury, from one electrode to another electrode so as to ultimately short circuit the cell. Sulphonated polymers of the cation type have been found most effective and a commercial product of the Rohm and Haas Company marketed under the trade name of Amberplex C–1 has been found most satisfactory.

Figure 2:
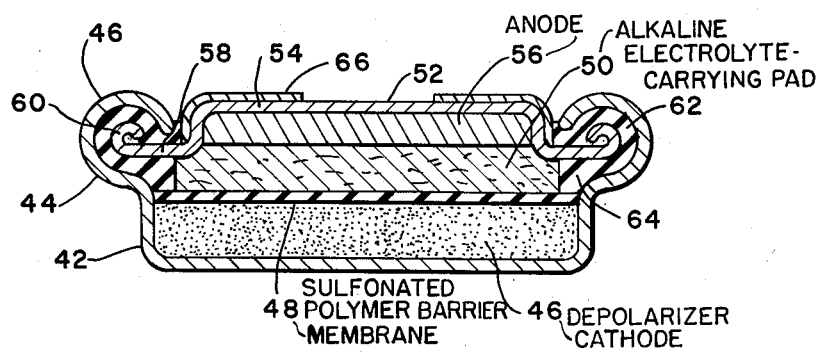

These and further objects and advantages of the invention shall become apparent upon reference to the following specifications and claims and appended drawings wherein:

FIGURE 1 is a vertical section through a disc type primary cell constructed according to one embodiment of the present invention; and FIGURE 2 is a vertical section through a disc type primary cell constructed according to another embodiment of the invention.

Referring to FIGURE 1, there is shown a disc type primary cell housed in a casing comprising a bottom section 10 and a top section 12. The bottom section has a lower cylindrical portion 14 and an upper outwardly flared portion 16 which terminates in a rolled over rim 18. Compressed within the lower section 14 of the bottom 10 is a depolarizer cathode 20 formed of an electrolytically reducible oxygen yielding compound. The cathode is preferably formed of a metal oxide and may, as an example, consist of mercuric oxide containing 10% graphite.

Located directly above the depolarizer cathode and engaging the side walls of the casing bottom 10 is a barrier screen 22. This barrier screen is formed of a sulfonated polymer of the cation type, which may, as an example, comprise sulfonated polystyrene which is marketed by Rohm and Haas under the trademark Amberplex C–1. The thickness of this barrier is of considerable importance in order to obtain the unexpected results of this invention and preferably should be between approximately 10 and 15 mils.

Located directly above the barrier screen 22 is a holddown washer 24 which is formed with a comparatively heavy rim 26 and a comparatively flexible inner flange 28. The washer closely adheres to the flared wall 16 of the upper section of the casing bottom. The inner flange 28 is formed at an angle of greater than 90° to the rim and in a normal position extends downward from the horizontal plane of the washer. In its position above the screen, the force due to the inherent resiliency of the flange is exerted downward on the barrier screen to normally hold the screen in firm engagement with the cathode as the cathode becomes exhausted during the life of the cell. Located above the washer 24 is an electrolyte carrying pad 30 which may comprise a porous paper of a known type.

The casing top 12 has an inverted dished anode carrying portion 32 surrounded by a depending flange 34. This flange 34 extends outwardly to form a rim 36 which is rolled over the rolled edge 18 of the flared portion 16 of the casing bottom 10. Between the rim 36 and rolled-over edge 18, a sealing washer 38 is situated and insulates the cap casing top and its anode from the casing bottom. The uppermost portion of the sealing washer 38 also bears against the flange 26 of the washer 24 to urge it into engagement with the barrier. The physical construction of the cell casing, the flared wall, and the hold-down washer are more particularly set forth and are claimed in the assignee's copending application Serial No. 550,565, filed December 2, 1955, now Patent No. 2,877,285.

The electrolyte pad 30 is saturated with a concentrated alkaline electrolyte which preferably consists of potassium or sodium hydroxide in a 20 to 50% by weight solution. This solution is preferably fully saturated with zinc oxide.

A zinc anode 40 is mounted in the dished portion 32 of the cap 12 and may consist of powdered zinc consolidated into a solid mass and amalgamated with mercury. The anode may be soldered into the casing cap in the manner described and claimed in assignee's copending application Serial No. 615,409, filed October 11, 1956, now Patent No. 2,862,987.

While the barrier screen 22 exhibits no discernible permselective characteristics in this type of concentrated alkaline cell, it has been found to be remarkably effective in preventing the migration of any free particles of mercuric oxide or, during the operation of the battery wherein metallic mercury is formed, the migration of small droplets of mercury. In the conventional cell, these droplets of mercury and/or particles of mercuric oxide tend to eventually form a conductive path between the cathode and the anode and thus short circuit and deplete the battery. Experimentation definitely indicates that the barrier screen of this invention effectively prevents the passage of these particles and materially lengthens the life of the cell.

The reaction in the cell is as shown below:

*Cell reaction anode*

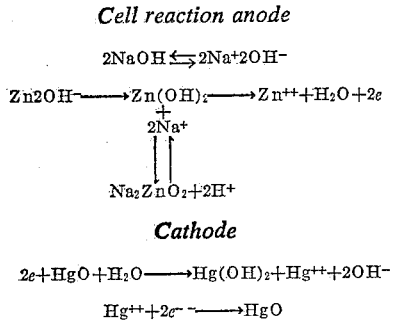

*Cathode*

$$2e + HgO + H_2O \longrightarrow Hg(OH)_2 + Hg^{++} + 2OH^-$$

$$Hg^{++} + 2e^- \longrightarrow HgO$$

Referring now to FIGURE 2 there is shown another embodiment of a disc type cell formed according to the present invention. In this embodiment of the invention, the casing bottom 42 has an outwardly flared portion 44 which terminates in a rolled-over rim 46. The casing bottom holds a cathode depolarizer 46 of the same type as described in connection with the preceding embodiment of the invention and this is covered by a permselective barrier 48 of the cation exchange type, also as described in connection with the embodiment of the invention shown in FIGURE 1. The barrier 48 is covered by an electrolyte pad 50 containing a concentrated alkaline electrolyte as previously disclosed.

The cell cap 52 comprises a downwardly dished portion 54 housing a zinc anode 56 as described in the preceding embodiment. The cap 52 has an outwardly extending flange 58 which terminates in a rolled-over edge 60 received within the rim 46. In this embodiment of the invention the function of the hold-down washer and sealing gasket are combined. That is to say, a sealing gasket 62 is received between the rolled-over end 60 and rim 46 and has a thickened lower portion 64 which resiliently engages barrier 48 to hold it down and to force it into tight engagement with the cathode depolarizer 46 during the entire life of the cell as the cathode is expended. The gasket 64 may be formed of neoprene. The details of the casing construction of this cell are presented and claimed in assignee's copending application Serial No. 697,616, filed November 20, 1957, now Patent No. 2,951,891. An insulating coating 66 may be provided over the upper portion of the cap 52 to prevent unwanted short circuits when the cell is mounted in the device in which it is to be used.

The operation of the cell illustrated in FIGURE 2 is the same as that illustrated in FIGURE 1 and the permselective barrier screen 48 performs the same unexpected function. The casing construction utilized in FIGURE 2 provides high resistance to internal cell pressures as is described in further detail in the aforementioned copending application directed to this type of cell.

Cells constructed in the foregoing manner possess a quite extended shelf life and cell failure through the formation of internal short circuits is practically eliminated.

This application is a continuation-in-part of copending application Serial No. 558,151, filed January 9, 1956, now abandoned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A primary cell comprising a container; an anode and a cathode in said container; an alkaline electrolyte in said container; and a barrier membrane formed of a sulfonated polymer of the cation exchange type separating said anode and cathode and in contact with said electrolyte; the alkaline concentration of said electrolyte being sufficiently great to induce said barrier membrane to exercise substantially no permselective effect in the reaction in said cell.

2. A primary cell as defined in claim 1 wherein the alkaline concentration of said electrolyte is at least about 20% by weight of said electrolyte.

3. A primary cell as defined in claim 2 wherein said alkaline concentration is about 20–50% by weight of said electrolyte.

4. A primary cell as defined in claim 2 wherein said electrolyte is selected from the group consisting of sodium and potassium hydroxide.

5. A primary cell as defined in claim 1 wherein the construction of said cell is such as to form mercury containing particles during the cell reaction.

6. A primary cell as defined in claim 1 wherein said barrier membrane is formed of a sulfonated polystyrene of the cation exchange type.

7. A primary cell comprising a container; an anode and a cathode in said container; said cathode being formed of a material capable of furnishing mercury-containing particles; an alkaline electrolyte in said container having an alkaline concentration of at least 20% by weight of said electrolyte; and a barrier membrane formed of a sulfonated polymer of the cation exchange type separating said anode and cathode and in contact with said electrolyte.

8. A primary cell as defined in claim 7 wherein said membrane is formed of a sulfonated polystyrene of the cation exchange type.

9. A primary cell as defined in claim 8 wherein said electrolyte is selected from the group consisting of sodium and potassium hydroxides.

10. In a primary cell having an anode, a cathode and an alkaline electrolyte between said anode and cathode having an alkaline concentration sufficiently great to induce a barrier membrane formed of a sulfonated polymer of the cation exchange type located between said anode and cathode to exercise substantially no permselective effect in the reaction in said cell, a method of preventing short circuiting of said cell through migration between said anode and cathode of current-carrying particles comprising interposing between said anode and cathode of a barrier membrane formed of a sulfonated polymer of the cation exchange type.

References Cited in the file of this patent

UNITED STATES PATENTS

| | | |
|---|---|---|
| 2,606,941 | Ruben | Aug. 12 1952 |
| 2,636,851 | Juda et al. | Apr. 28, 1953 |
| 2,700,063 | Manecke | Jan. 18, 1955 |
| 2,816,154 | Mendelsohn | Dec. 10, 1957 |
| 2,844,642 | Schwarz et al. | July 22, 1958 |
| 2,851,510 | Pauli | Sept. 9, 1958 |
| 2,861,116 | Grubb | Nov. 18, 1958 |
| 2,877,285 | Kempf | Mar. 10, 1959 |